US009449462B2

(12) United States Patent
Bartholomew

(10) Patent No.: US 9,449,462 B2
(45) Date of Patent: Sep. 20, 2016

(54) METHOD AND APPARATUS FOR AWARDING INDIVIDUAL OR GROUP POINT MULTIPLICATION

(71) Applicant: IGT, Las Vegas, NV (US)

(72) Inventor: Robert P. Bartholomew, Corvallis, OR (US)

(73) Assignee: IGT, Las Vegas, NV (US)

( * ) Notice: Subject to any disclaimer, the term of this patent is extended or adjusted under 35 U.S.C. 154(b) by 235 days.

(21) Appl. No.: 14/040,567

(22) Filed: Sep. 27, 2013

(65) Prior Publication Data

US 2014/0100019 A1 Apr. 10, 2014

Related U.S. Application Data

(63) Continuation of application No. 13/372,922, filed on Feb. 14, 2012, now Pat. No. 8,545,314, which is a continuation of application No. 10/572,091, filed as application No. PCT/US2004/030697 on Sep. 16, 2004, now Pat. No. 8,202,156.

(51) Int. Cl.
*A63F 9/00* (2006.01)
*G07F 17/32* (2006.01)
*G06Q 20/42* (2012.01)

(52) U.S. Cl.
CPC ......... *G07F 17/3244* (2013.01); *G06Q 20/425* (2013.01); *G07F 17/3232* (2013.01); *G07F 17/3234* (2013.01); *G07F 17/3255* (2013.01)

(58) Field of Classification Search
None
See application file for complete search history.

(56) References Cited

U.S. PATENT DOCUMENTS

| 5,572,882 A | 11/1996 | Schafer |
| 5,655,961 A | 8/1997 | Acres et al. |
| 5,752,882 A | 5/1998 | Acres et al. |
| 5,779,546 A | 7/1998 | Meissner et al. |
| 6,004,207 A | 12/1999 | Wilson et al. |

(Continued)

FOREIGN PATENT DOCUMENTS

| JP | 2001-340611 | 12/2001 |
| JP | 2002-171284 | 6/2002 |
| JP | 2004-180956 | 7/2004 |

OTHER PUBLICATIONS

International Search Report and Written Opinion of the International Searching Authority dated Mar. 15, 2005 for related PCT Application No. PCT/US2004/30697 9 pages.

(Continued)

*Primary Examiner* — Seng H Lim
(74) *Attorney, Agent, or Firm* — Neal, Gerber & Eisenberg LLP

(57) ABSTRACT

In use, the player would insert his or her player card at the EGM 10. The system checks to see if any multiplier currently applies to the machine and player. The multiplier is available as a token and can communicate to the guest via display on the EGM. The multiplier would be displayed using a conditional message feature of the display. Session points would accumulate at the "multiplied" rate and are displayed as such on the EGM display. Alternately, an assurance message is available to be displayed frequently that shows the current multiplier. When the player removes his or her card, the session is posted to the patron management system. Casino personal can then review the session detail by accession the history of the player at a workstation capable of querying the player tracking system. The session multiplier and points earned by the multiplier are listed within the record.

11 Claims, 5 Drawing Sheets

(56) References Cited

U.S. PATENT DOCUMENTS

| | | | |
|---|---|---|---|
| 6,048,269 | A | 4/2000 | Burns et al. |
| 6,135,884 | A | 10/2000 | Hedrick et al. |
| 6,149,521 | A | 11/2000 | Sanduski |
| 6,179,710 | B1 | 1/2001 | Sawyer et al. |
| 6,267,671 | B1 | 7/2001 | Hogan |
| 6,319,125 | B1 | 11/2001 | Acres |
| 6,328,649 | B1 | 12/2001 | Randall et al. |
| 6,368,216 | B1 | 4/2002 | Hedrick et al. |
| 6,471,208 | B2 | 10/2002 | Yoseloff et al. |
| 6,569,015 | B1 | 5/2003 | Baerlocher et al. |
| 6,575,832 | B1 | 6/2003 | Manfredi et al. |
| 6,636,892 | B1 | 10/2003 | Philyaw |
| 6,638,164 | B2 | 10/2003 | Randall et al. |
| 6,659,461 | B2 | 12/2003 | Yoseloff et al. |
| 6,746,333 | B1 | 6/2004 | Onda et al. |
| 6,875,110 | B1 | 4/2005 | Crumby |
| 6,908,387 | B2 | 6/2005 | Hedrick et al. |
| 7,112,138 | B2 | 9/2006 | Hedrick et al. |
| 7,341,518 | B2 | 3/2008 | Muskin |
| 7,585,218 | B2 | 9/2009 | Mead et al. |
| 2001/0004607 | A1 | 6/2001 | Olsen |
| 2001/0048193 | A1 | 12/2001 | Yoseloff et al. |
| 2002/0010012 | A1 | 1/2002 | Dayan et al. |
| 2002/0034974 | A1 | 3/2002 | Wood et al. |
| 2002/0055381 | A1 | 5/2002 | Tarantino |
| 2002/0111209 | A1 | 8/2002 | Walker et al. |
| 2002/0155887 | A1 | 10/2002 | Criss-Puszkiewicz et al. |
| 2002/0173355 | A1 | 11/2002 | Walker et al. |
| 2003/0054881 | A1 | 3/2003 | Hedrick et al. |
| 2003/0069063 | A1 | 4/2003 | Bilyeu et al. |
| 2003/0069071 | A1* | 4/2003 | Britt .................. G07F 17/32 463/42 |
| 2003/0100360 | A1 | 5/2003 | Manfredi et al. |
| 2003/0148812 | A1 | 8/2003 | Paulsen et al. |
| 2003/0176219 | A1 | 9/2003 | Manfredi et al. |
| 2004/0038731 | A1 | 2/2004 | Englman |
| 2004/0229700 | A1 | 11/2004 | Cannon et al. |
| 2004/0254011 | A1 | 12/2004 | Muskin |
| 2005/0059456 | A1 | 3/2005 | Mead et al. |
| 2005/0059480 | A1 | 3/2005 | Soukup et al. |
| 2006/0281523 | A1 | 12/2006 | Walker et al. |
| 2007/0077989 | A1 | 4/2007 | Bozeman |
| 2011/0256918 | A1 | 10/2011 | Yang |
| 2012/0322533 | A1 | 12/2012 | Gomez et al. |

OTHER PUBLICATIONS

U.S. Final Office Action dated Aug. 4, 2009 issued in U.S. Appl. No. 10/572,091 13 pages.

U.S. Final Office Action dated Jul. 2, 2008 issued in U.S. Appl. No. 10/572,091 8 pages.

U.S. Notice of Allowance dated Feb. 28, 2012 issued in U.S. Appl. No. 10/572,091 5 pages.

U.S. Office Action dated Jan. 22, 2009 issued in U.S. Appl. No. 10/572,091 12 pages.

U.S. Office Action dated Nov. 16, 2011 issued in U.S. Appl. No. 10/572,091 9 pages.

U.S. Office Action dated Oct. 30, 2007 issued in U.S. Appl. No. 10/572,091 9 pages.

U.S. Third-Party Submission dated Aug. 7, 2012 issued in U.S. Appl. No. 13/272,922 7 pages.

* cited by examiner

METHOD AND APPARATUS FOR AWARDING INDIVIDUAL OR GROUP POINT MULTIPLICATION

CROSS-REFERENCE TO RELATED APPLICATIONS

This application is a continuation of U.S. patent application Ser. No. 13/372,922, filed on Feb. 14, 2012, which is a continuation of U.S. patent application Ser. No. 10/572,091, filed on Mar. 14, 2006, now U.S. Pat. No. 8,202,156, issued on Jun. 19, 2012, which is a National Stage of International Application No. PCT/US2004/030697 filed on Sep. 16, 2004, the entire disclosures of which are incorporated herein by reference for all purposes.

BACKGROUND

1. Field of the Invention

This invention relates generally to electronic gaming machines and more particularly to a method and apparatus for integrating secondary bonusing schemes within primary gaming machines coupled to an external control system.

2. Description of the Prior Art

Linking together electronic slot machines on a computer network is known in the art. One example of such a network is disclosed in U.S. Pat. No. 5,572,882 to Acres et al. ("the '882 patent"), which is assigned to the assignee of the present application. The '882 patent is incorporated herein by reference for all purposes and discloses a number of different bonuses, which pay awards to players at their respective slot machines that are over and above any awards dictated by the paytables of the machines.

One such bonus award is paid randomly to one of the players via that player's slot machine. Once a slot machine is selected for this type of award, a computer on the network transmits a command to the slot machine that causes it to pay a predetermined amount from the hopper of the machine to the player.

Another type of award is personal to each player and is based on the level of that player's play. As discussed in the '882 patent, a player may be issued a player-tracking card that is insertable into a card reader associated with each slot machine. The network collects data relating to the player's play and stores it in a central computer. Personal awards to the player may be a predetermined amount or a percentage of the player's total play. They are awarded upon the occurrence of a predetermined event, e.g., when the player's cumulative wagers exceeds a predetermined level.

Player tracking points is another award sometimes given to players of networked gaming devices. Each player who uses their card accrues a predetermined number of points for each dollar wagered on the networking gaming machines. Some systems award points for jackpots won on the machines. In any event, the player is eligible to redeem his or her points for complimentary meals, merchandise, or other awards determined by the casino that operates the slot machines. In addition to point accrual based on play, points are often awarded to induce players to sign up for carded play.

The awarding of player tracking or complementary ("comp") points for casino play is a long existing and well-proven tool of the casino industry to reward loyalty and encourage more frequent play. Furthermore, general point multiplication is also well established. This is generally used to entice players into a casino during non-peak playing times of the day and/or less busy days of the week. Such systems, however, are global in that all players are treated in the same fashion.

Accordingly, the need remains for a more flexible system for awarding comp points to casino patrons.

SUMMARY

The present invention incorporates the concept of point multiplication into promotions focused to individual players or player groups to provide individualized enticements.

In principle, there are two broad categories of uses for this concept and within those categories. The use categories are: promotional multiplied point time, and reward multiplied point time. In all of these cases, the multiplied point time is configurable for the active time period. In many of the examples, an all-day approach would be more suitable. But in some cases, particularly those where the multiplied point time is being used as an award, a much more limited time period would be appropriate. Some examples of the expected potential uses of this concept are:

Some examples of the expected potential uses of this concept are where a multiplied point award is granted on special days specific to the player identified. Such special days can include the birthday of the player, an anniversary, the first day of slot club membership, and an anniversary of slot club membership. Multipliers can also be applied to groups of players such as those born in a particular month, all women, everyone over a certain age, or anyone from a certain geographic location (e.g. limited by city and/or state). Multiple point rewards may also be granted based on individual achievement such as the achievement of a personal play goal, where a random award is made to the player based on a casino visit, as well as an awarding the multiple based on a machine game outcome such as when a Lucky Coin result is hit.

Player point multiples can have several criteria. The value of the multiplier is one such selectable criterion. Other criteria include a schedule for activating the multiplier, e.g., by day, date and time, and whether a single instance or a recurring instance (with or without exceptions), as well as the duration in which the multiplier is active. Specific players can be associated with the multiplier as well as groups, and certain games can also be associated with the multiplier. Finally, certain coupons or other collectables may trigger the multiplier.

The foregoing and other objects, features and advantages of the invention will become more readily apparent from the following detailed description of a preferred embodiment of the invention that proceeds with reference to the accompanying drawings.

DETAILED DESCRIPTION

A player specific game system (PSGS) allows a casino to track a player's game playing (and other) activity and adjust game characteristics to meet a player's tastes, playing habits, budget, and to keep their interest. Loyalty awards, such as complementary points, can be specifically tailored to directly impact the player's game play according to the teachings of the invention. Benefits to the casino include a more direct communication platform through which loyalty building promotional information can be delivered to a customer. Additionally, the casino is able to rapidly change loyalty promotions, which builds player excitement and keeps players interested in returning to the particular casino.

Figure 1:
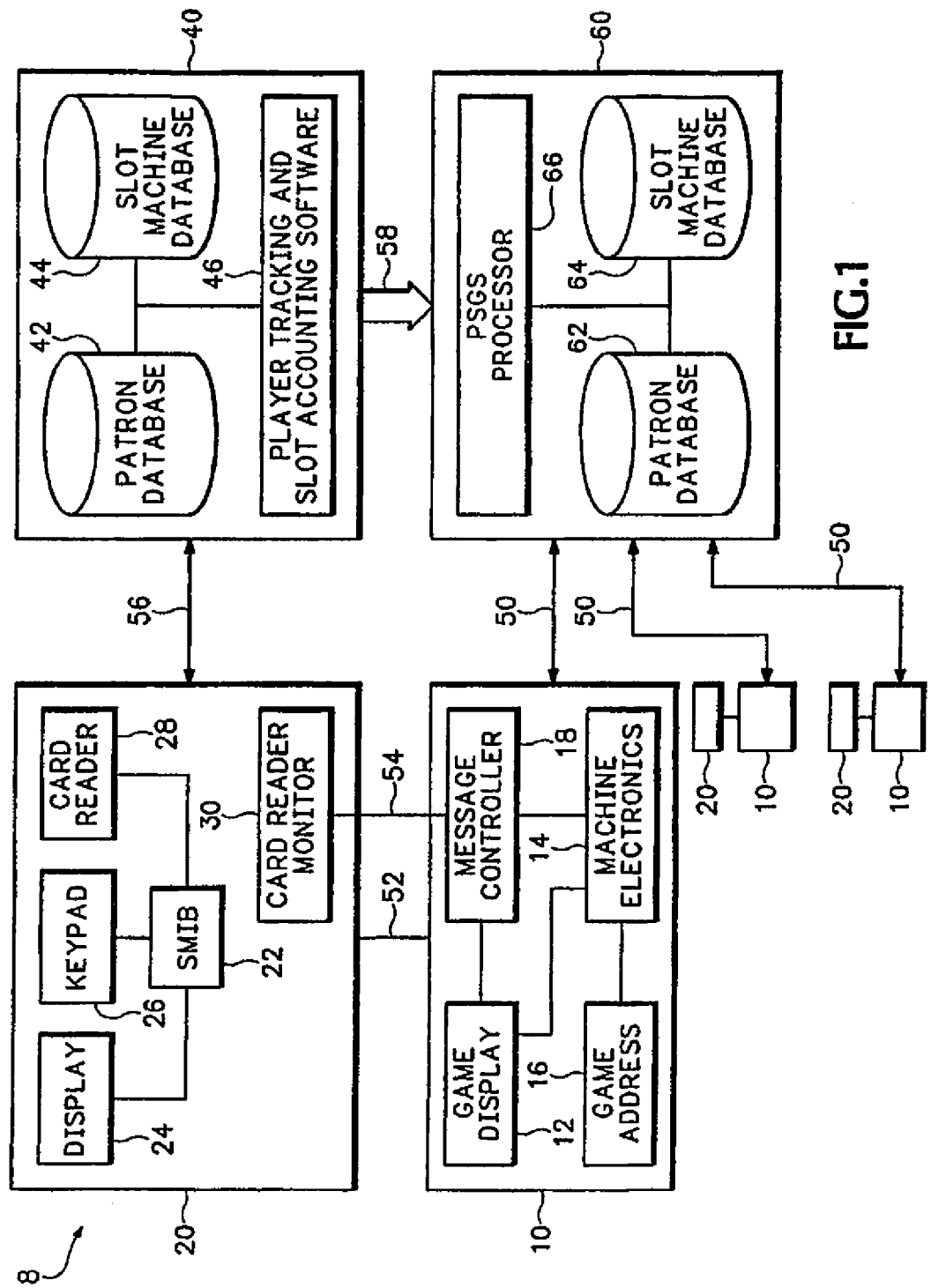
FIG. 1 is a block diagram illustrating components of the PSGS system according to an embodiment of the invention.

FIG. 1 illustrates an example PSGS system 8 according to embodiments of the invention. The PSGS system, generally, includes a customizable electronic gaining machine 10 (EGM), a set of player tracking hardware 20, a player tracking system 40, and a PSGS server 60. Each of the components can communicate with one another over communication interfaces. For example, the PSGS server 60 communicates to the EGM 10 over a PSGS network 50, which can be a wired or wireless network, or a combination of both. The EGM 10 communicates to the player tracking hardware 20 over a communication link 52, which is well known to those skilled in the art. For example, descriptions of the link 52 and the interaction between an EGM 10 and a player tracking system 20 are included in U.S. Pat. No. 5,655,961 and U.S. Pat. No. 6,319,125, assigned to the assignee of the present invention. A card reader monitor component 30 of the player tracking hardware 20 can communicate directly with machine electronics 14 of the EGM 10 through a separate communication link 54. The player tracking hardware 20 communicates with the player tracking system 40 over a communication link 56, also known as a casino system network.

Card reader 30 reads a player-tracking card that is issued by the casino to individual players who choose to have such a card. Card reader 30 and player-tracking card are known in the art, as are player-tracking systems, examples being disclosed in the '961 patent and '125 patent. Briefly summarizing such a system, a player registers with the casino prior to commencing gaming. The casino issues a unique player-tracking card to the player and opens a corresponding player account that is stored on an accounting system. The account includes the player's name and mailing address and perhaps other information of interest to the casino in connection with marketing efforts. Prior to playing one of the EGMs in FIG. 1, the player inserts the card into reader 30 thus permitting the player tracking system 40 to track player activity, such as amounts wagered and won and rate of play.

To induce the player to use the card, the casino awards each player points proportional to the money wagered by the player. Players consequently accrue points at a rate related to the amount wagered. The points are displayed on display 24. In prior art player tracking systems, the player may take his or her card to a special desk in the casino where a casino employee scans the card to determine how many accrued points are in the player's account. The player may then redeem points for selected merchandise, meals in casino restaurants, or the like, which each have assigned point values.

Before describing the manner in which the present invention is implemented on the network of slot machines depicted in FIG. 1, consideration will first be given to terminology used in the description.

First, a player-tracking account is one that is established by the casino, typically for an identified player—although the invention could be implemented with an anonymous account. The player-tracking account is referred to herein as a player account. When the player inserts his or her card into card reader 30 of EGM 10, information related to that player's account is fetched from the host computer, transmitted on the network, and stored in the RAM included in SMIB 22 of EGM 10. Such information includes player-tracking points, which are referred to generally herein as account points. In accordance with the present invention, the player's account may also include credits that may be transferred by the player from the player's account to the credit meter on the machine and thereafter wagered by the player. These credits in the player's account are referred to herein as account credits and are awarded and redeemed as described hereinafter. Credits appearing on the credit meter of EGM 10 are referred to herein as meter credits.

As used herein the term jackpot indicates an award made resulting from the paytable on one of the EGMs while the term bonus indicates an award that does not result from the machine's paytable. The '125 patent and '882 patent include many examples of bonuses. The term award is intended to encompass any payment given to a player of one of the EGMs and includes both jackpots and bonuses. The term base credits is the term used to signify the bonus granted to a base player ("level 1") depending upon that player's level of play—that is, how much that player has wagered over the period being tracked. The term earned credits signifies the bonus stored within the player account at the player server 42 in consideration of that player's actual player level—that is, the base credits amount multiplied by the earned credit multiplier. As will be appreciated in the description included further below, earned credits are not yet available for play until the redemption period. The earned credit multiplier is a number between 1 and 10 and can be made higher for higher level (and thus higher valued) players. In this way, higher level (e.g. more desirable) players are encouraged to play more often at the casino by receiving a higher bonus award for a certain level of play. The term redeemed credits signifies the credits actually available for play by the player on a gaming machine during the redemption period. The number of redeemed credits is calculated according to a preferred embodiment of the invention by multiplying the number of earned credits in the player account by a redeem credit multiplier value, set by the gaming operator to encourage players to play at certain times. Once redeemed credits are played at the gaming machine, they are considered played credits.

Casino networks are well known in the industry and are detailed in the '961 patent referenced above. The player tracking system 40 communicates to the PSGS server 60 through one or more gateways, illustrated here as a communication link 58. Detailed discussion of the types of communication between all of the components in the PSGS system 8 follows.

Although only one detailed EGM 10 is illustrated in FIG. 1, multiple EGMs 10 can be connected to the PSGS server 60 over a separate or shared communication link 52. Each of the EGMs 10 has an accompanying set of player tracking hardware 20, which also connects to the player tracking system 40 through a casino system network link 56, although these links have been omitted in FIG. 1 for clarity.

Within the PSGS server 60 are a patron database 62 and a slot machine database 64, the contents of which are described below. The PSGS server 60 may be embodied by a single or multi-processor computer having 1-4 CPUs, for example. Intel PENTIUM or AMD 32 or 64 bit processors operating at 2 Ghz or faster could drive the server 60. The operating system could be a MS Windows, BSD, or Linux based system, for example Redhat Advanced server. The database could be Oracle, SQL Server, MySQL, or PostgreSQL and connected by JDBC (Java DataBase Connectivity), for instance. Additionally, the PSGS server 60 can host a web server, such as an Apache server, and an application server such as Tomcat or JBoss, which are well known in the industry. Security on the PSGS network 50 uses SSL (Secure Socket Server). A communication protocol for use between the PSGS server 60 and the EGM 10 could be XML-RPC Communication protocol, for instance.

The EGMs 10 may be powered by a less powerful processor than the PSGS server, such as a single Intel Celeron or Pentium processor. In one embodiment, the EGMs 10 operate using a customized kernel for the Linux Operating System.

The EGM 10 may communicate to the Player Specific Game Server 60 over the PSGS network 50 using an Ethernet port. The protocol used could be TCP/IP. Upon initialization, the EGM 10 will configure the network adapter utilizing an address obtained for the particular machine. A game address block 16 may include an address, for example a TCP/IP address burned into an EPROM that is coupled to a set of machine electronics 14. When initialized, the machine electronics reads the previously burned address as the address to use for itself on boot-up. Providing a previously burned and relatively hard coded address provides security from an EGM being hacked by unauthorized personnel. Instead of an EPROM, a hardware dongle could also provide address information.

The identity EPROM, or equivalent, may contain information such as a resort ID, a casino ID, a machine serial number, the IP address for the machine, an IP subnet mask, a machine broadcast address, a machine gateway address, and an application Server URL. When the EGM 10 initializes, it sends the information from the identity EPROM to the PSGS server 60, where the particular EGM 10 can be authorized as eligible to connect to the PSGS system 8.

Providing an identity EPROM has advantages in that it provides a mechanism of providing a unique ID for the machine that is independent from the EGM 10, it provides a measure of security because the data is in binary format and not easily read or modified without the proper tools, and the structure is easy to setup in the field.

The EGMs 10 also include increased security measures that ensure only authorized personnel access the machines. For instance, only authorized personnel with appropriate levels of access (and keys) are able to obtain entry to the internals of the EGM 10. All door opens and closures are recorded. Personnel must possess and be authorized to create the identity EPROM, and further, the EPROM must pass version/hash comparison testing.

Once initiated, a technician will be able to verify the TCP/IP address that is read from the game address block 16 by reading the address on the game display 12. The IP address will only be shown on the game display 12 during installation or servicing modes, and will not be available to the general public.

Multi-Session Gaming

In embodiments of the invention, a game is presented that can be played by players that identify themselves to the game owner, such as a casino, and by players who are unknown to the casino. Identified players are known as "carded" players because they identify themselves by placing an identification card into a card reader 28 (FIG. 1) in the player tracking hardware 20. Unknown players, i.e., those who do not insert an identity card, are known as "uncarded" players.

In a base game and bonus scheme, certain features are available to carded players that are not available to uncarded players. These special game features may be advertised to uncarded players to give them an extra incentive to join the loyalty program in the casino where the game is located.

In a particular embodiment a game according to embodiments of the invention includes a base game, which could be a video slot machine for instance. The base game may be played by carded and uncarded players alike. The game can include one or more bonuses. Some of the bonuses are available to carded and uncarded players, while other bonuses are available only to carded players. In one particular bonus, available only to carded players, the players take a simulated "journey" along a path beginning at a first location and ending at a known destination. An indicator of where the player is on the journey advances along a displayed route, so the player knows where they are in the journey. A player advances to another point on the journey when events occur. For instance, in a simple embodiment, the journey may begin after the carded player has played for "x" minutes, or has played "y" number of games, or has played "z" amount of value in the game. The last determination, amount of value played in the game is known as "coin-in", and is a measure of how much money the patron has spent on the game, no matter how long it took the patron to do so. Using coin-in is a convenient way to measure patron activity. For example, the journey may include 10 stopping points and the player advances to the next stopping point after the player has the minimum amount of coin-in since the previous stopping point. In a more advanced embodiment, the triggering event that causes a player to advance from one stopping point to another can be a random or pseudo random event.

To complete a reward journey, a player may have to spend a relatively long time at the game. Using embodiments of the invention, a player may split portions of the reward journey into multiple "sessions" of play. For instance, the player may initially play the game for 45 minutes and may advance to the second of ten stops on the reward journey. In embodiments of the invention, because the player is a carded player, the PSGS server 60 may record and "store" the player's progress. Thus, when the player returns and re-identifies themselves by inserting their player identification card into the game, the game returns to its previously stored state where the player had already advanced to the second of ten stops in the reward journey. When the player then plays the game enough to advance to the next stopping point, the game automatically advances to the third stopping point, rather than beginning again at the first. In this way, the entire reward journey can be played over multiple gaming sessions, which encourages players to return to the same casino.

In another embodiment of the game, the player may be able to continue the reward journey on machines in more than one casino, provided the casinos are related. Under this scenario, a resort group might have a Player's Club that spans multiple properties and would want to encourage return play to any property within that group.

In another yet embodiment of the game, as players move from one stop to another in the journey, they may acquire a token that is randomly selected from a group of possible tokens. At the end of the journey, the tokens are "redeemed", and the number of different tokens the player has collected along the journey determines a final reward to the player for completing the journey. Higher rewards can be awarded for higher numbers of unique tokens gathered on the journey, with the highest reward being awarded to the player who gathers a unique token for each stop on the journey.

Game Screen

Figure 2:
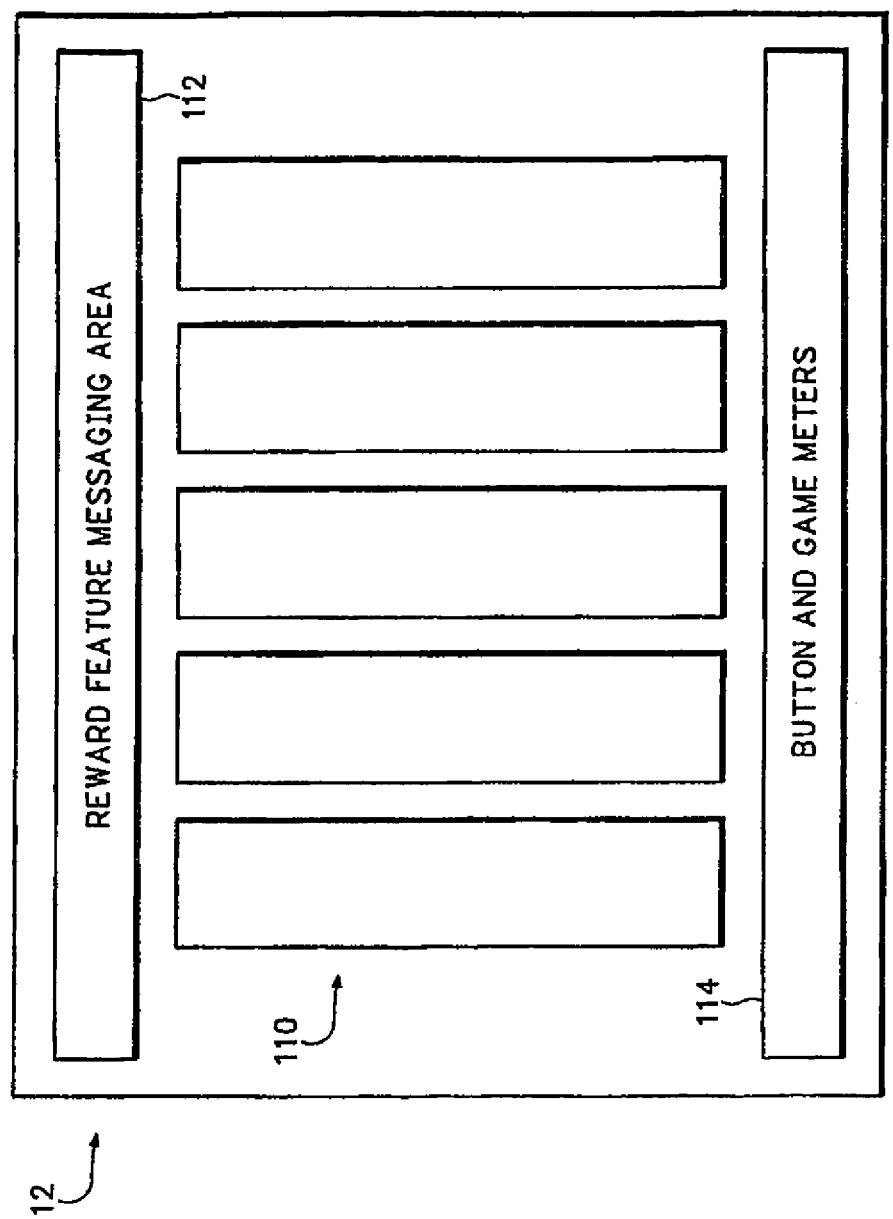
FIG. 2 is a block diagram illustrating divisions on a game screen according to embodiments of the invention.
Figure 3:
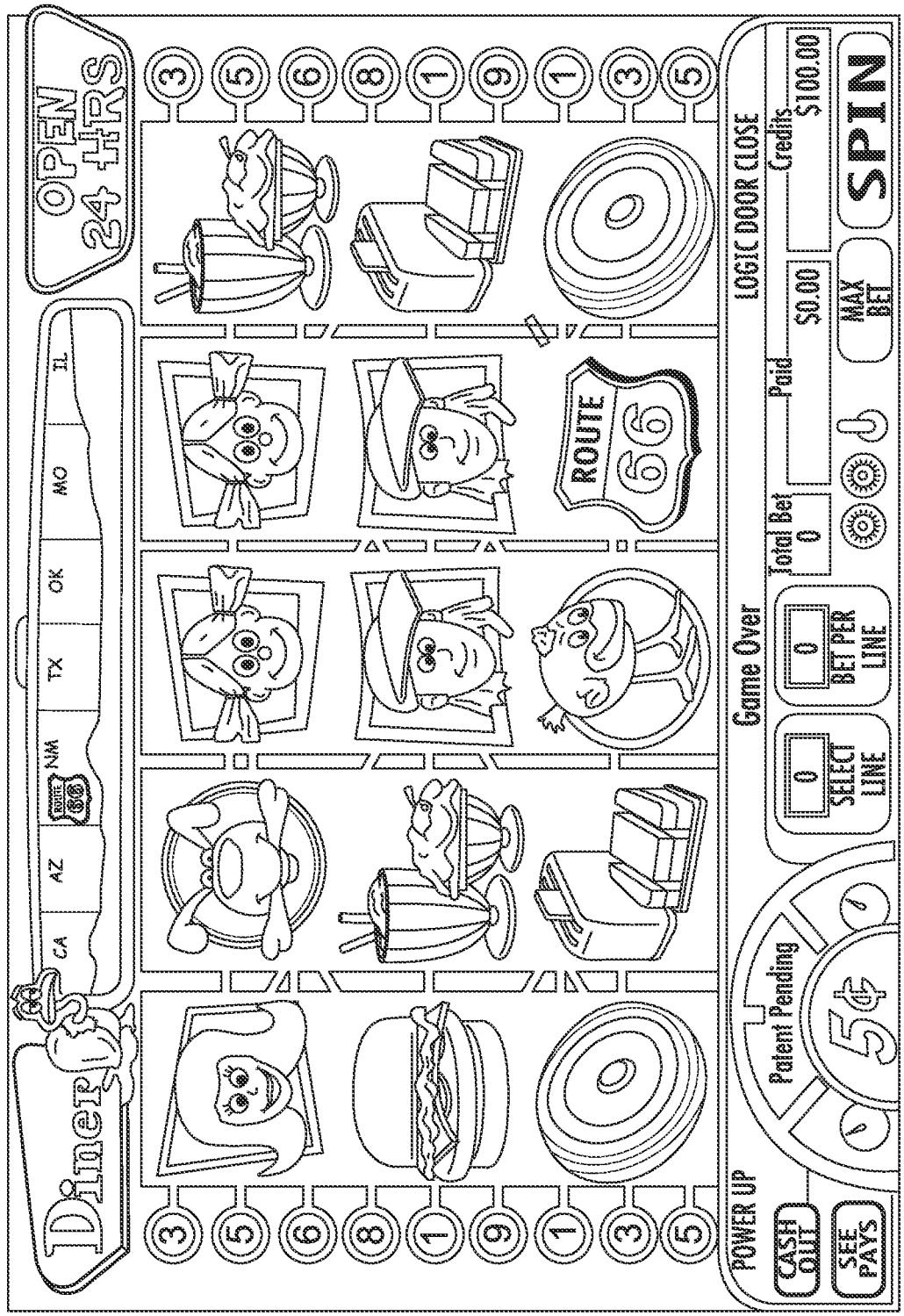
FIG. 3 is a screen shot illustrating an example game screen with a Player's card inserted.
Figure 4:
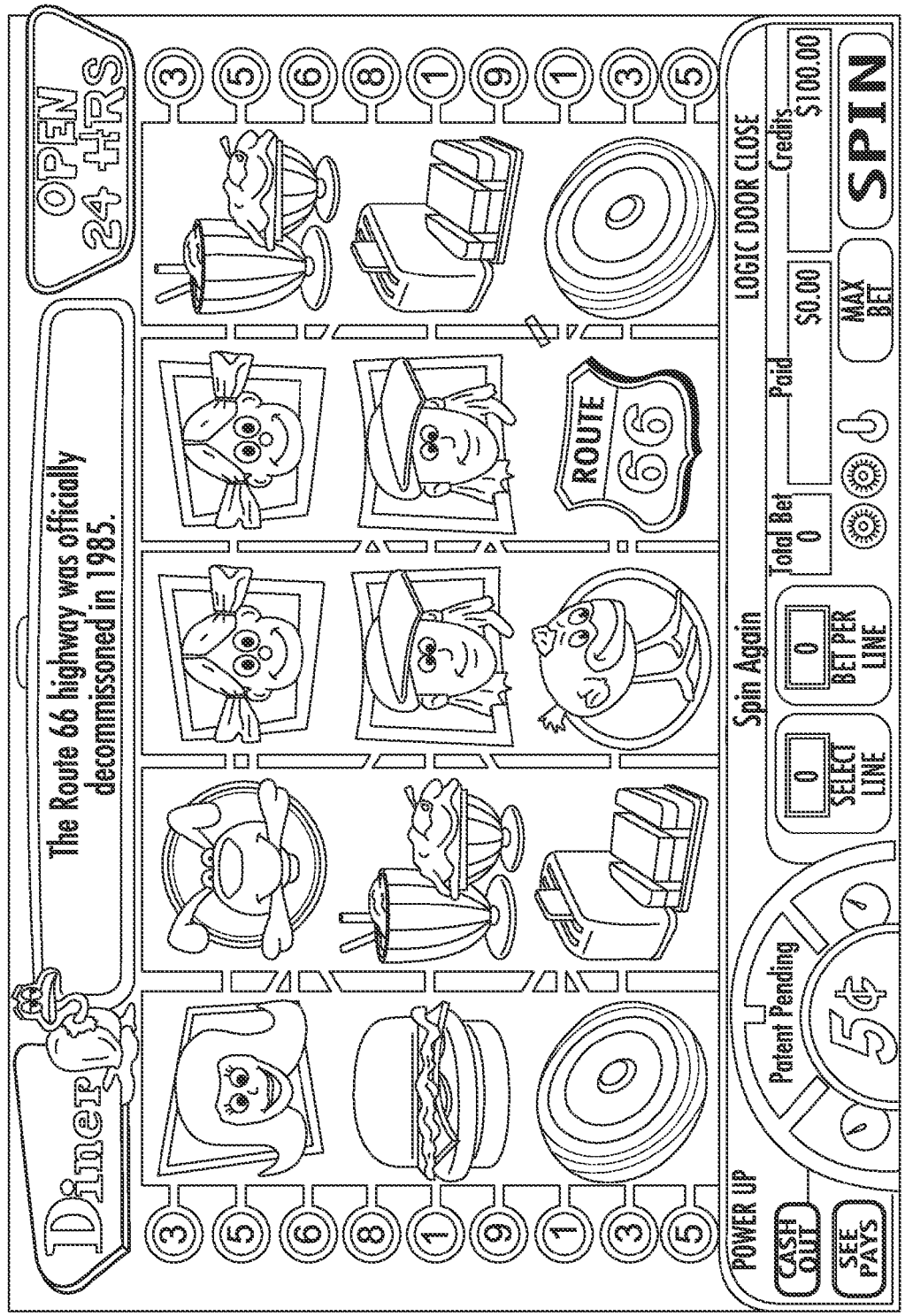
FIG. 4 is a screen shot illustrating an example game screen with a Player's card removed.

FIG. 2 illustrates in block form a sample game screen that can be used in embodiments of the game, and FIGS. 3 and 4 illustrate an illustrated sample screen. Almost any conceivable type of game can be used to embody elements of the invention, but for purposes of illustration a video slot machine will be described. The primary game is a 5 or 9-line, 5 reel video slot machine. A 9-line video slot is illustrated in FIG. 3. Typically, the game would have a second screen reward feature that could be won by carded and non-carded players alike. The second reward screen feature could be funded i.e., rewards paid out of, a pool accumulated by an overall payback percentage of the machine, or another reward pool funding mechanism could be employed. In some embodiments, the reward pool operates similar to a personal progressive reward as described below. Personal progressive awards are well known to those skilled in the art.

Referring back to FIGS. 1 and 2, a game screen 12 is divided into a central area 110, where the main game is shown, a reward feature messaging area 112, and a button and game meter area 114. In this embodiment, the central area 110 is divided into five discrete areas for video reels.

The reward messaging area 112 is can include messages informing the patron of reward features, status in the reward feature, help screens, paytable screens, and other miscellaneous details to help explain or entertain the patron. As illustrated in FIG. 3, the reward messaging area 112 includes a simulated "map" of Route 66, from Illinois to California, while the same area in FIG. 4 shows an informative message to the player. Graphics to be displayed in the messaging area 112 can be stored within the EGM 10 itself, or within the PSGS server 60, for instance. If the graphics are stored on the EGM 10, the PSGS server 60 can direct the EGM when to display particular graphics. Communication protocols between the PSGS server 60 and the EGM 10 are discussed in detail below.

When the game on the EGM 10 is initialized, an initial view is illustrated on the display 12. Messages and graphics can be shown informing the player that certain benefits are available to a carded player that are not available to an uncarded player. In addition, the initialization screen may allow a non-carded player to view a details screen, described below, as well as the paytable for the reward feature.

When a player inserts his or her card, a message in the reward feature messaging area 112 can welcome the player by name and can communicate the player's status in the reward feature, such as by generating a map indication the player's current position on the "journey".

If a non-carded player is playing the game on the EGM 10, the reward messaging area 112 can illustrate enticing messages that invite the non-carded player to register to become a carded player.

While a carded player is playing, the reward messaging area 112 can show different types of screens, such as indicating to the player their present position in the reward journey, a list of tokens the player has already collected, and an amount of money that the player could win by completing the reward journey.

Downloadable Paytables

Because of the interaction and communication between the PSGS server 60 and the EGM 10, it is possible to control or modify some components of game that previously were uncontrollable. Specifically, the machine paytables themselves can be stored on the PSGS server 60, for example on the slot machine database 64, and be downloaded into the EGM 10 as part of the game initialization, or after the game is initialized. In operation, downloading paytables could be implemented by using the messaging system described below.

Paytables relate the outcome of a game played to the benefit received by the player for the particular game outcome. EGMs 10 typically include a standard paytable for a game, i.e., the paytable that is the standard paytable offerings for that game. In addition, one or more (or all) of the elements within the paytable can be changed by downloading new data from the PSGS server 60 into the EGM 10.

Game tables can be changed for a number of reasons. For instance they can be changed for different times of the day. Also, they can be changed for specific promotions. The machine paytables can also be changed for individual players or groups of players. For instance, a first set of game paytables can be created for a player with no detail history stored in the player tracking system 40. Then, as more is learned about the player's style, habits, preferences, skill level, etc., for example, the game tables can be modified by running a process on the PSGS server 60. Once modified, the PSGS server 60 can cause the modified paytable to be downloaded to the game for the player. In one embodiment, when a player identifies himself or herself by inserting a player tracking card, the PSGS server 60 retrieves the personalized machine paytable and downloads it to the EGM 10 at which the player is playing. Then, the EGM 10 changes its current paytable to the one just loaded by the PSGS server 60, such that the gaming table is personalized for that player.

The award table for player complementary points can also be modified in consideration of the specific player identified. The present invention incorporates the concept of point multiplication into promotions focused to individual players or player groups to provide individualized enticements.

In principle, there are two broad categories of uses for this concept and within those categories. The use categories are: promotional multiplied point time, and reward multiplied point time. In all of these cases, the multiplied point time is configurable for the active time period. In many of the examples, an all-day approach would be more suitable. But in some cases, particularly those where the multiplied point time is being used as an award, a much more limited time period would be appropriate.

As a promotional reward, a casino can manipulate the amount of points given at the slot machine during specific times or for specific players. The purpose of this modification is to provide an automated method of configuring the multiplier, the applicable time of the multiple, and the players to which the multiple applies.

Some examples of the expected potential uses of this concept are where a multiplied point award is granted on special days specific to the player identified. Such special days can include the birthday of the player, an anniversary, the first day of slot club membership, and an anniversary of slot club membership. Multipliers can also be applied to groups of players such as those born in a particular month, all women, everyone over a certain age, or anyone from a certain geographic location (e.g. limited by city and/or state). Multiple point rewards may also be granted based on individual achievement such as the achievement of a personal play goal, where a random award is made to the player based on a casino visit, as well as an awarding the multiple based on a machine game outcome such as when a Lucky Coin result is hit.

Player point multiples can have several criteria. The value of the multiplier is one such selectable criterion. Other criteria include a schedule for activating the multiplier, e.g., by day, date and time, and whether a single instance or a recurring instance (with or without exceptions), as well as the duration in which the multiplier is active. Specific players can be associated with the multiplier as well as groups, and certain games can also be associated with the multiplier. Finally, certain coupons or other collectables may trigger the multiplier.

In use, the player would insert his or her player card at the EGM 10. The system checks to see if any multiplier currently applies to the machine and player. The multiplier is available as a token and can communicate to the guest via display on the EGM. The multiplier would be displayed using a conditional message feature of the display. Session points would accumulate at the "multiplied" rate and are displayed as such on the EGM display. Alternately, an assurance message is available to be displayed frequently that shows the current multiplier. When the player removes his or her card, the session is posted to the patron management system. Casino personal can then review the session detail by accession the history of the player at a workstation capable of querying the player tracking system. The session multiplier and points earned by the multiplier are listed within the record.

Certain business rules may apply to the player points multiplier system. Players may be part of more than one multiplier group, with only the highest multiple applying. Multiples may alternately be additive in nature. At card in, a "timer" is given to the gaming machine electronics that provides the remaining amount of time that the multiplier is in effect. This is to protect the casino from fraud if the player chooses to leave his or her card in for an extended period of time. Point earned are accounted for separately from base point to coin ratio points so that the calculation of comp dollars (another known casino promotion) as a factor of points earned is not affected by the inventive multiplier promotion.

The multiplier values may be passed through the network to active and qualified machines in advance of the multiplier actually taking effect. A player playing under a normal 1:1 multiplier may after a few minutes enter into in a scheduled multiplier promotion event. The player would earn player points according to the initial regular 1:1 multiple and then, when the bonus multiplier takes effect, begin to accumulate subsequent points by a multiplied ratio. A bonus multiplier ending during a play session would operate in reverse, with the multiplied points being awarded until the multiplier event ends and then points are accumulated as normal.

The valued by which points are multiplied are preferably a positive decimal with 2 places; i.e.: 1.25. Though theoretically the number may be quite large, a configurable "safety" number or allowable max should be kept in the database. This would prevent users from entering any number greater than this allowable max. This value is then applied to included players during the scheduled period.

The multiplier (and recurring event) can be scheduled via a patron management application using a user interface similar to Outlook marketed by Microsoft Corporation. It is preferred that the application permit removing a selected instance of the multiplier. For instance, a recurring multiplier set to run on Wednesdays from 2:00 PM to 4:00 PM would allow a user to remove a particular Wednesday (e.g. one occurring during a popular gaming day).

In creating a multiplier, the user would have to determine if it was applicable to all players or to a specific group. If the group option is selected, the user would select one or more Groups to associate to the multiplier. If a player is part of more than one multiplier, the highest is used—the multipliers are NOT added together.

Similar to associating players to the multiplier, the user would have to determine if the multiplier is applicable to all machines on the floor or to specific machines. If the specific machine option is selected, the user would select one or more machines to associate to the multiplier. A machine may be part of more than one multiplier though the multiplier to be applied is determined by the user playing the machine as described in the above process. The machine selector must be user-friendly and permit selection by denomination, game type (reel, video), (non-)participation, bank, etc.

In a coupon-triggered multiplier, this type of multiplier depends upon the presentation of a bar-coded coupon at a patron management workstation in order to become effective. Once the coupon is presented, the player is part of the multiplier for a configurable period of hours afterwards.

A point multiplier configuration table is shown in Table 1 below:

TABLE 1

Multiplier Configuration

| Multiplier ID | Description | Begin | End | Multiplier | Recurring |
|---|---|---|---|---|---|
| 1 | Double Point Wednesdays From 10:30-11:30 AM | May 29, 2002 | N/A | 2 | Y |
| 2 | Bus Bonus Points for Machines 10000-12000, 15000-15430 and for Player Groups XYZ Tours, ABC Junkets | Jun. 1, 2002 | Aug. 30, 2002 | 3 | N |
| 3 | Four Times 4th of July | Jul. 4, 2002 (12:00 AM) | Jul. 4, 2002 (11:59 PM) | 4 | N |

| Multiplier ID | Exceptions | Players | Coupon? | Created | Created by |
|---|---|---|---|---|---|
| 1 | Y | All | N | May 1, 2003 | S. Kastner (59425) |
| 2 | N | Group | Y | May 2, 2003 | C Iddings (12345) |
| 3 | N | All | N | Jun. 15, 2003 | C. Iddings (12345) |

The point multiplier audit trail configuration detail would be detailed as in Table 2:

TABLE 2

Point Multiplier Audit Trail

| Multiplier ID | Description | | Begin | End |
|---|---|---|---|---|
| 1 | Double Point Wednesdays | | May 29, 2002 12:00 AM | N/A |

| Date Time | User | Field | From | To |
|---|---|---|---|---|
| May 1, 2003 12:00 AM | S. Kastner (59425) | Description | — | Double Point Wednesday |

TABLE 2-continued

Point Multiplier Audit Trail

| | | | | |
|---|---|---|---|---|
| May 1, 2003 12:00 AM | S. Kastner (59425) | Begin | — | May 29, 2003 12:00 AM |
| May 1, 2003 12:00 AM | S. Kastner (59425) | Recurrence | — | Occurs every Wednesday effective May 29, 2003 from 10:30 AM to 11:30 AM |
| May 1, 2003 12:00 AM | S. Kastner (59425) | Machines | — | <All> |
| May 1, 2003 12:00 AM | S. Kastner (59425) | Players | — | <All> |
| May 1, 2003 12:00 AM | C. Iddings (12345) | Machines | <All> | 10000-12000, 15000-15430 |

A point multiplier session detail would list the sessions by multiple instance, e.g. the player sessions affected by the multiplier. The fields of the session detail would include such information as the player, the session start, the session end, the machine ID, the coin in, the base points earned, the multiplier points earned, the actual win, and the theoretical win.

As one can imagine, countless variations in modifying machine tables are possible. The PSGS server 60 may modify machine paytables at games to which it is connected every hour. Therefore, a particular machine outcome at 5:00 am may be different from one at 11:00 pm. Additionally, if a player known to the PSGS server 60 is playing a machine at 5:00 am, the PSGS could be programmed to either override the standard "modified" paytable, or to load the paytable that has been "created" for that particular player. It is also possible to change the paytable to the player specific paytable at some times and not at others. Even further, it is possible to have modified paytables for each individual EGM 10. For instance, paytables can be modified for games at a first casino, but not at a second casino. Or, paytables can be modified for a particular game at a casino based on the game's physical location. In short, the PSGS system 8 control of modified game tables can extend down to the level of a different paytable for a player for each and every single game to which the PSGS system is connected. However, there may be too much overhead in keeping so many modified paytables for each of the players, and keeping modified paytables per game type for particular players may be an acceptable level of control/service for the overhead involved.

Messaging to the Player

As the player plays the game on the EGM 10, the existing player tracking system 40 records details about the player, as well as stores historical records on the player's past play, and other details about the player. The PSGS system 60 is able to use past and present data about the player to provide individualized messages to the player through the display 12 of the EGM, or, in other embodiments, though a display 24 on the player tracking hardware 20 (FIG. 1).

The player is identified to the EGM 10 through the player tracking hardware 20, illustrated in FIG. 1. The player tracking hardware 20 can include a Serial Machine Interface Board (SMIB) 22, a display 24, which can be a touch-screen display, a keypad 26, and a card reader 28. Additionally the player tracking hardware 20 can include a card reader monitor 30 that monitors events of the player tracking hardware, as described below.

Figure 5:
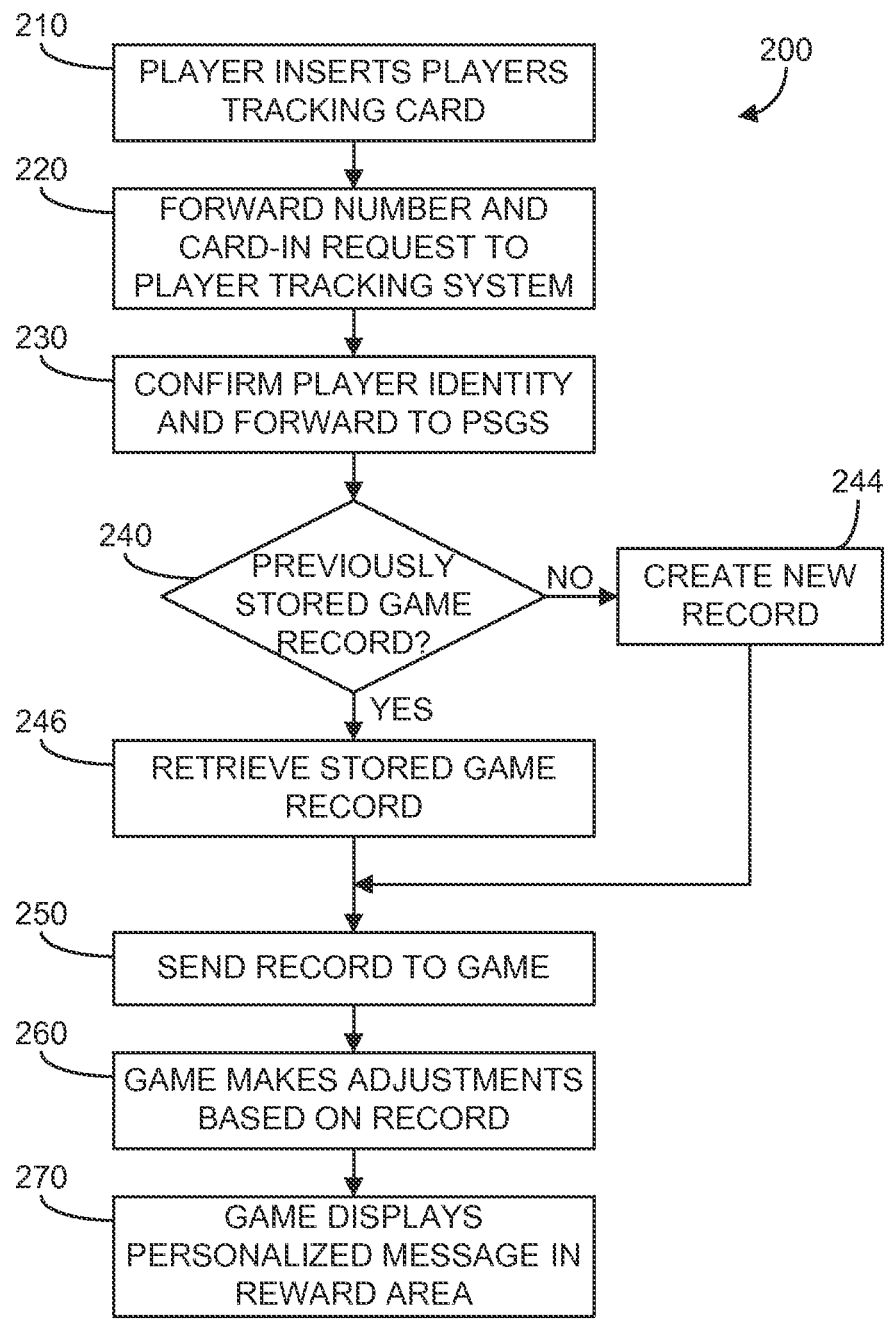
FIG. 5 is an example flow diagram illustrating communication between components of the PSGS system according to embodiments of the invention.

FIG. 5 is an example flow diagram illustrating general processes that can be used in embodiments of the invention and illustrates the communication between different components of the PSGS system 8 of FIG. 1.

A flow 200 begins at a process 210 when a player inserts their player tracking card into the card reader 28 of the player tracking hardware 20. The card reader monitor 30 reads data from the card and can perform a low-level check on the card before sending the data from the card to the player tracking system 40, along with a "card-in" request, in a process 220.

The player tracking system 40 authenticates the player by verifying the information against data stored on a patron database 42 and/or a slot machine database 44 in a process 230. This information is then sent to the PSGS server 60. In a process 240, the PSGS server 60 determines if the particular identified player has a previously stored game record, i.e., that the player had already began a reward journey in a previous game session. If not, a new game record is created in a process 244. If the player had a previous game session, the record is retrieved in a process 246. Then, either the newly created or the retrieved record is sent to the EGM 10 in a process 250.

Once the record is sent to the EGM 10, the game makes adjustments based on the record in a process 260. For example, if the player had already progressed to the third of ten stops in the reward journey, then the EGM 10 would change to a state where the third stop had already been reached. Next, the EGM 10 displays a personalized message in the reward area 112 of the gamescreen 12, which informs the player that he or she has been recognized by the system, and that credit for previous play has been acknowledged and accredited by the EGM 10.

The following provides more details of messaging and message interaction between the between card reader monitor 30 (CRM 30), the message controller 18 (MC 18), the EGM 10 and the PSGS server 60 according to embodiments of the invention.

The MC 18 is the "traffic cop" for messaging within the PSGS system 8 of FIG. 1. The MC 18 can be embodied by a process that runs on the EGM 10, but is separate from the game itself. Typically, the MC 18 would be started before a game running on the EGM is started, and would be running prior to the player tracking hardware 20 being initialized. The MC 18 could be a software process that is initialized using an AGPx start-up process. In the event the MC 18 terminates abnormally, it automatically restarts and reestablishes communications to the various components to which it is connected.

In operation, the MC 18 receives and disperses messages to and from authorized and intended processes, such as a game operating on the EGM 10, the card reader monitor 30, and the PSGS server 60. When the MC 18 initializes, it registers itself with the PSGS server. In some embodiments, the MC 18 communicates to the PSGS server over the PSGS network 50 using XML based messaging.

The MC 18 can maintain a "heart beat" between itself and the PSGS server 60, between itself and the game operating on the EGM 10, and between itself and the card reader monitor 30.

Typically, the MC 18 functions in two modes: a first when all necessary processes are present, and a second in which one of the necessary processes is missing, as determined by the heart beat. When one of the processes is missing, the MC 18 can still operate, such as when various components are being simulated. This could be beneficial during testing, for instance.

Messages between the MC 18 and the game operating on the EGM 10, and between the PSGS server 60 can be of any acceptable format. One example format uses serialized messages using RMI (Remote Method Invocation), which is a closed message format/protocol not used by any other types of gaming device or gaming network. Having a private message protocol protects the integrity of the gaming system and prevents intrusion from outside, non-authorized users. The MC 18 can also include an open messaging format, which allows the MC 18 to interface with standard gaming devices. The open messaging format may use standards such as XML and the protocol such as XML-RPC, which can be utilized by systems developed in the Java language, and in systems developed in languages other than Java. The messages can be encrypted utilizing SSL, which will ensure the messages cannot be intercepted.

The MC 18 may cache a limited number of messages at the local level, i.e., within the process itself that runs on the EGM 10. Caching larger amounts of messages may cause problems, for instance if the player were to hit numerous bonus events and/or reward redemptions during a communications failure between the MC 18 and the other components. Under that scenario, a player could in fact redeem his/her winnings then move to another machine and resume play. If communications were down, the PSGS system 8 would be unaware that the player had already redeemed the awards and could possibly resume play at the point where communications had failed. Therefore, the possibility would exist that the player redeems the rewards twice. To prevent against this possibility, only a very limited number of messages are can go unacknowledged by the PSGS server 60 before PSGS functionality is disabled.

For example, if the PSGS server 60 does not respond before the aforementioned message limit is reached, another message will be sent to the EGM 10 which causes the PSGS functionality to be disabled due to server non-availability. In case of a power failure on the EGM 10, the MC 18 should be able to retain a message log, which is stored on the EGM 10, and resynchronize with the PSGS server 60 once communication has become re-established.

Various message types can be used between the PSGS server 60, the MC 18, and the card reader monitor 30. In developing messages or a messaging system, considerations such as those listed below in Table 3 can be considered.

TABLE 3

Message Information

| Message Type | Message Description |
| --- | --- |
| Message | class name of the message |
| Message Handler | class name of the handler for the message |
| Originator | Who originated this message? |
| Recipient | Who is the intended recipient? |
| Purpose | Why is this message being generated? |
| Transport Mechanism | Along each step in the process, what mechanism is used? |
| Format | What data format is utilized? |
| Data | What data is being sent? |
| Response Expected | What response (if any) can be expected? |
| Actions Taken | What actions will the recipient perform in response? |

Particular EGM messages can be sent between the various components as set forth in Table 4.

TABLE 4

EGM Messaging

| Message Type | Message Description |
| --- | --- |
| ACK | Acknowledges receipt if no particular data is needed |
| Bonus Reward | Sent to PSGS server 60 to update a database with a current bonus event. |
| Bonus Redemption | Sent to PSGS server 60 to update game state at the final conclusion of a game session. |
| Heartbeat | Ensures communications are operative in the PSGS system 8. If heartbeat messages are not regularly received by the various components, the various components may shut down. |
| Machine Authentication | Upon EGM 10 startup, the game authenticates with the PSGS server 60. When received, the PSGS server 60 makes a database update that the particular EGM 10 is active. |
| Machine Transfer | Sent from the PSGS server 60 to a game on the EGM 10 to inform the game of casino configurable options such as timeouts, polling frequencies, which rewards are available to the game, etc. |
| Patron Authentication | When a card-in event occurs, the identification of the patron is verified. |
| Patron Bet | A message sent to the PSGS server 60 that enables it to cumulate the total number of individual bets placed by the patron. |
| Patron Bet Response | The PSGS server 60 acknowledges the Patron Bet message and the bet is removed from the game state restoration mechanism. |
| Patron Transfer | Sent from the PSGS server 60 to the EGM 10, this message includes information collected from the player tracking system 40, including their name, ID, status, birth date, etc. |
| Session Begin | Sent from the EGM 10 to the PSGS server 60, this causes the PSGS server 60 to either retrieve a previously stored gaming session, or to create a new session. |
| Session Begin | Sent to the PSGS server 60 from the EGM 10, this signifies the player has ended the currently active session. |
| Session End | Sent to the EGM 10 from the PSGS 60, this message contains a session that was requested by the EGM 10 with a Session Begin message. |

An example sequence of messages between the EGM 10, the player tracking hardware 20, the player tracking system 40, and the PSGS server 60 Message Sequence is reproduced below.

The message sequence begins when the EGM 10 is initially powered, and it generates a Machine Authentication message. The PSGS server 60 receives the message, authenticates the machine, and sends back a Machine Transfer message. When a card-in event occurs, the card reader monitor 30 generates input to the message controller 18, which in turn generates a Patron Authentication message to the PSGS server 60. After the PSGS server 60 receives the Patron Authentication message, it retrieves the data on the particular patron and sends a Patron Transfer message to the EGM 10, which includes data about the player.

Next, the message controller 18 generates a Session Begin message and the PSGS server 60 generates a Session Transfer message in response, sending the information of either a stored game session that was retrieved from one of the PSGS server databases 62, 64, or a new game session.

When a player places a bet, the EGM 10 generates a Patron Bet message, which is received by the PSGS server 60 and updates the particular database 62, 64. Then the PSGS server 60 generates a Patron Bet Response message and sends it back to the EGM 10. When a patron achieves a target, i.e., a stop on the reward journey, the EGM 10 generates a Bonus Reward message, and sends it to the PSGS server 60. The PSGS server 60 receives the Bonus Reward message, updates its database 62, 64, and generates an Ack message in response.

If a card-out event occurs, i.e., the player removes their player id card, the card reader monitor 30 generates input to the message controller 18. The message controller 18 then generates a Session End message and sends it to the game running on the EGM 10. The game then generates another Session End message and sends it to the PSGS server 60. In response, the PSGS server 60 updates its database 62, 64, and closes out the particular game session that it had previously opened.

The heartbeat messages are on-going and are constantly sent between the message controller 18 and the PSGS server 60. In response, the PSGS server 60 generates and returns an Ack message.

Having described and illustrated the principles of the invention in a preferred embodiment thereof, it should be apparent that the invention can be modified in arrangement and detail without departing from such principles. We claim all modifications and variation coming within the spirit and scope of the following claims.

What is claimed is:

1. A method comprising:
   determining, by at least one processor and using a standard paytable, awards for one or more players of a game on a gaming machine;
   interfacing, by a player tracking device reader of the gaming machine, with a physical player tracking device of a player;
   identifying, by the at least one processor and based at least in part on said interfacing, the player associated with the physical player tracking device using a player record stored in a player database;
   receiving, by the at least one processor, a personalized machine paytable associated with the player record, the personalized machine paytable including a player point modifier, wherein if the player qualifies for a plurality of different player point modifiers, the player point modifier is a largest player point modifier of the plurality of player point modifiers; and
   determining, by the at least one processor, an award for the player during the game using the personalized machine paytable, the award including a quantity of player points determined based at least in part on the player point modifier.

2. The method of claim 1, which includes determining, by the at least one processor, the award for the player using: (1) the personalized machine paytable during a first predetermined time, and (2) the standard paytable during a second predetermined time.

3. The method of claim 1, further comprising transmitting to a remote server player specific gaming information collected while the player plays the game.

4. The method of claim 3, wherein the player specific gaming information includes player game preferences.

5. The method of claim 3, wherein the player specific gaming information includes player game skill level.

6. The method of claim 1, which includes receiving, by the at least one processor, the personalized machine paytable during initialization of the game.

7. A computer-readable storage medium having machine instructions stored therein, the instructions being executable by a processor to cause the processor to perform operations comprising:
   determining, using a standard paytable, awards for one or more players of a game on a gaming machine;
   after a player tracking device reader interfaces with a physical player tracking device of a player, identifying, based at least in part on said interfacing, the player associated with the physical player tracking device using a player record stored in a player database;
   receiving a personalized machine paytable associated with the player record, the personalized machine paytable including a player point modifier, wherein if the player qualifies for a plurality of different player point modifiers, the player point modifier is a largest player point modifier of the plurality of player point modifiers; and
   determining an award for the player during the game using the personalized machine paytable, the award including a quantity of player points determined based at least in part on the player point modifier.

8. The computer-readable storage medium of claim 7, wherein the personalized machine paytable is used to calculate the award for the player during a first predetermined time, and the standard paytable is used to calculate the award for the player during a second predetermined time.

9. The computer-readable storage medium of claim 7, further comprising transmitting to a remote server player specific gaming information collected while the player plays the game.

10. The computer-readable storage medium of claim 9, wherein the player specific gaming information includes player game preferences.

11. The computer-readable storage medium of claim 9, wherein the player specific gaming information includes player game skill level.

\* \* \* \* \*

UNITED STATES PATENT AND TRADEMARK OFFICE
CERTIFICATE OF CORRECTION

PATENT NO. : 9,449,462 B2
APPLICATION NO. : 14/040567
DATED : September 20, 2016
INVENTOR(S) : Robert P. Bartholomew It is certified that error appears in the above-identified patent and that said Letters Patent is hereby corrected as shown below:

On the Title Page

Item (63), please replace the Related U.S. Application Data with the following:

Continuation of application No. 13/372,922, filed on Feb. 14, 2012, now Pat. No. 8,545,314, which is a continuation of application No. 10/572,091, filed as application No. PCT/US2004/030697 on Sep. 16, 2004, now Pat. No. 8,202,156. Provisional application No. 60/503,756, filed on September 16, 2003.

In the Specification

Column 1, Lines 5-16, please replace the section entitled "CROSS-REFERENCE TO RELATED APPLICATIONS" with the following:

CROSS-REFERENCE TO RELATED APPLICATIONS

This application is a continuation of U.S. Patent Application No. 13/372,922, which was filed on February 14, 2012, which is a continuation of United States Patent Application No. 10/572,091, which was filed on February 6, 2007, and issued as U.S. Patent No. 8,202,156 on June 19, 2012, which is a national stage entry of International Application No. PCT/US2004/030697, which was filed on September 16, 2004, which claims priority to and the benefit of U.S. Provisional Patent Application No. 60/503,756, which was filed on September 16, 2003, the entire disclosures of which are incorporated herein by reference for all purposes.

Signed and Sealed this
Eleventh Day of April, 2017

Michelle K. Lee
*Director of the United States Patent and Trademark Office*